Nov. 4, 1958 R. E. SWITZER 2,858,996

DRIVE MECHANISM FOR RECORDING AND PLAYBACK MACHINES AND THE LIKE

Filed Jan. 28, 1955 3 Sheets-Sheet 1

INVENTOR.
Ralph E. Switzer
BY
Merchant & Merchant
ATTORNEYS

Nov. 4, 1958 R. E. SWITZER 2,858,996

DRIVE MECHANISM FOR RECORDING AND PLAYBACK MACHINES AND THE LIKE

Filed Jan. 28, 1955 3 Sheets-Sheet 1

INVENTOR.
Ralph E. Switzer
BY
Merchant & Merchant
ATTORNEYS

Nov. 4, 1958 R. E. SWITZER 2,858,996

DRIVE MECHANISM FOR RECORDING AND PLAYBACK MACHINES AND THE LIKE

Filed Jan. 28, 1955 3 Sheets-Sheet 3

INVENTOR.

Ralph E. Switzer

BY

Merchant & Merchant

ATTORNEYS

United States Patent Office 2,858,996

Patented Nov. 4, 1958

2,858,996

DRIVE MECHANISM FOR RECORDING AND PLAYBACK MACHINES AND THE LIKE

Ralph E. Switzer, Bryan, Ohio, assignor to J. J. Mickelson, as trustee for Mid-West Tooling Service, Inc., Minneapolis, Minn., a corporation of Minnesota Application January 28, 1955, Serial No. 484,604

4 Claims. (Cl. 242—55.12)

My invention relates to a drive mechanism for reeling and unreeling elongated flexible material, such as wire or tape, in a recording and playback machine or the like.

Generally, in recording and playback or reproducing machines involving the use of an elongated flexible record or material, such as wire or tape, the material is customarily handled by a winding or reeling mechanism comprising a pair of laterally disposed reels which serve alternately as a supply reel and a take-up reel, the material being unwound from the supply reel and wound on the take-up reel. During recording or playback, it is important that the record material be driven past the transducer head, disposed intermediate the pair of reels, at a constant velocity. Any backlash, slippage, slack or irregularity in the drive of the record material will naturally adversely affect the fidelity or quality of the recording or reproducing thereof. It is also expedient in most reeling and unreeling drive mechanism to provide, in addition to a constant speed drive of the flexible material during recording and playback, means for reeling or re-reeling the material at a speed or rate faster than the normal recording and playback velocity of the record material. The necessity for providing a constant velocity thereof and properly tensioning the record material moving between the supply and take-up reels has resulted in diverse generally complicated and/or ineffective driving mechanisms.

It is an object of my invention to provide a novel and improved drive mechanism for reeling and unreeling elongated flexible material which is simple in construction and simple, reliable and effective in operation.

It is another object of my invention to provide a novel and improved drive mechanism for reeling and unreeling elongated material on and from, respectively, a pair of spaced reels, whereby the material is moved between the reels and properly tensioned to maintain the material in a taut condition and to prevent irregularity in the movement thereof.

It is another object of my invention to provide a novel and improved drive mechanism for reeling and unreeling elongated material whereby the material is moved between the reels at a constant velocity.

It is another object of my invention to provide a drive mechanism for reeling and unreeling elongated material comprising a novel and improved clutch mechanism.

It is another object of my invention to provide a novel and improved drive mechanism for reeling and unreeling elongated material on a take-up reel and from a supply reel, respectively, wherein a continuous driving force is transmitted from a motor to both reels tending to drive them in opposite directions responsive to a single given direction of rotation of the motor.

It is a further object of my invention to provide a novel and improved drive mechanism for reeling and unreeling elongated material on a take-up reel and from a supply reel, respectively, wherein the drive train to each reel comprises a primary clutch shiftable between a fully released non-driving position and a positive drive position, and a continuously operating slippage clutch in parallel therewith.

These and other objects and advantages of my invention will be apparent from the following specification and claims, reference being had to the accompanying drawings wherein:

Fig. 3 is a view primarily in side elevation and partly in vertical section taken on the line 3—3 of Fig. 1;

Fig. 4 is a view in horizontal section taken on the line 4—4 of Fig. 3;

Figures 1, 2:
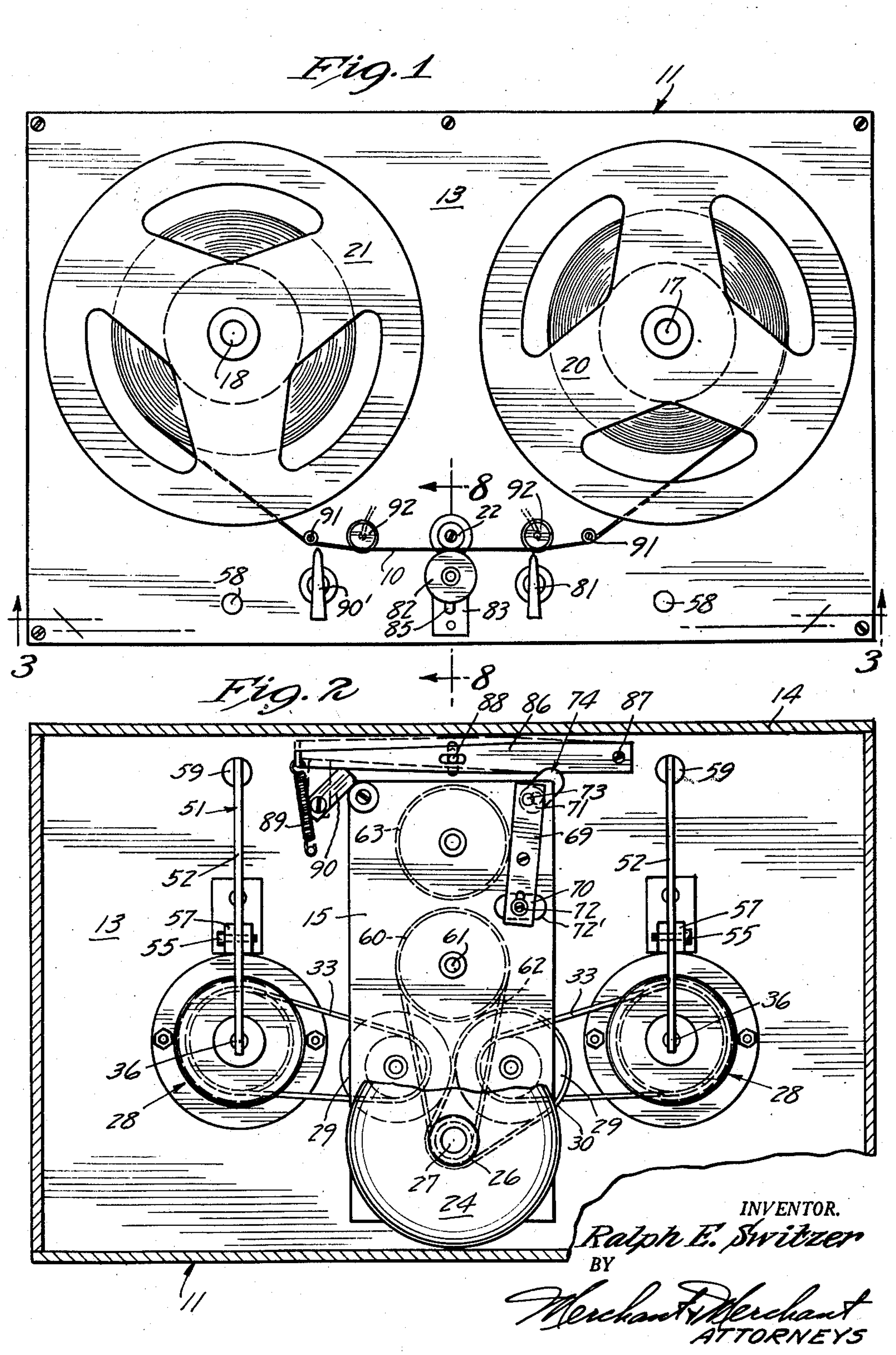
Fig. 1 is a view in top plan of my invention.
Fig. 2 is a view in bottom plan of the structure of Fig. 1.
Figures 1, 2:
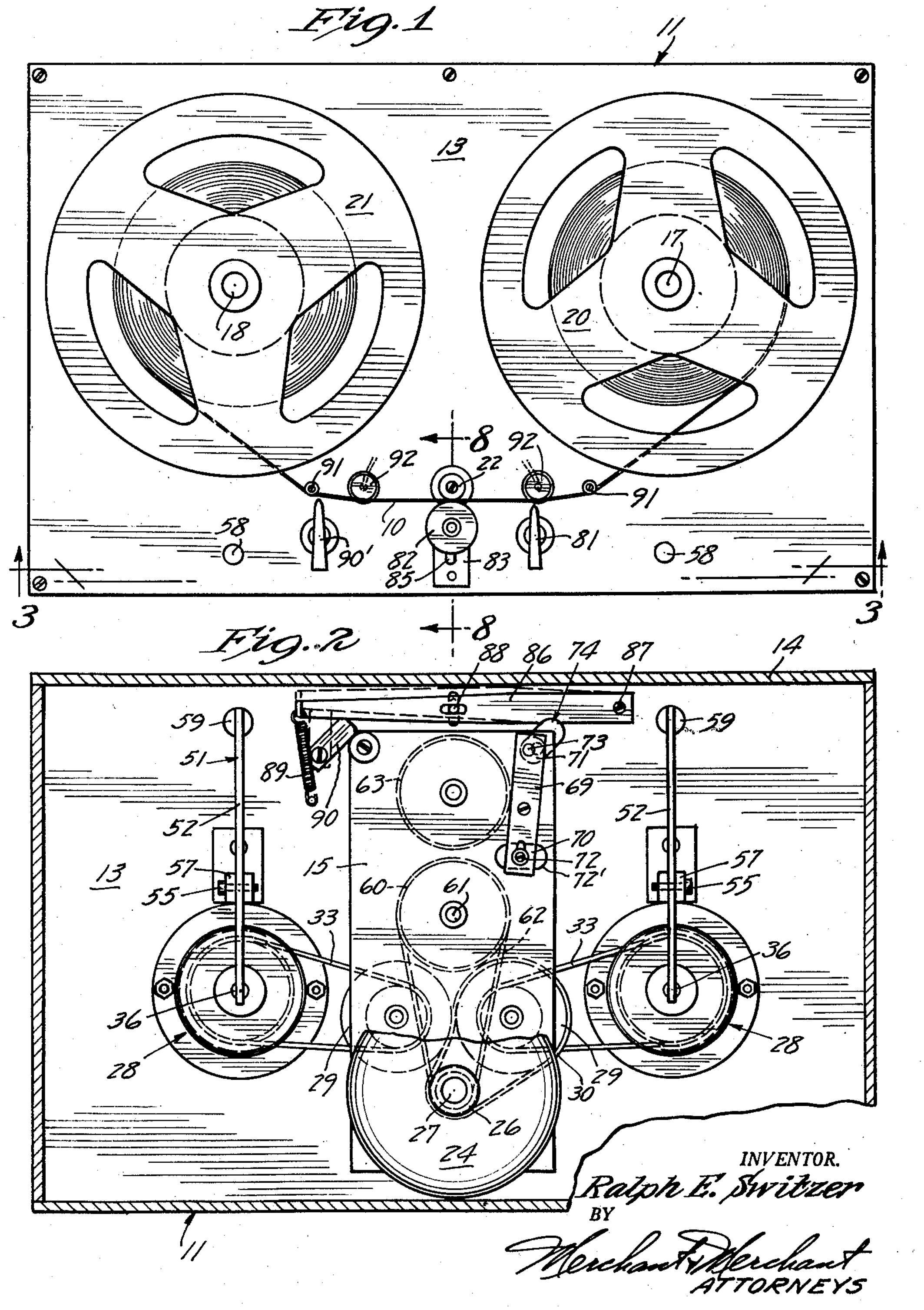

Referring more particularly to the drawings, wherein like parts are indicated by the same numeral, my invention relates to a drive mechanism for reeling and unreeling elongated flexible material 10, such as wire or tape, in a recording and playback machine, indicated by the general reference numeral 11, or the like. It will be obvious that many necessary elements of a recording and playback machine, such as a speaker, microphone, and the electrical elements and circuits for amplifying and translating electrical signals are not shown; however, the present invention relates to a drive mechanism which may be used with many forms and details of such elements, which are well known in the art, and also the present invention may be adapted for use in a machine other than a recording and playback machine.

Machine 11 comprises a mounting structure, indicated by the numeral 12, which consists of a top panel 13 mounted on a box-like enclosing structure 14, which may be any suitable housing or container, and a mounting plate 15 disposed beneath the top panel 13 and secured thereto in parallel relationship by depending cylindrical lugs 16. Two table-equipped reel mounting spindles 17 and 18 are journalled by bearings 19 in the top panel 13 of mounting structure 12 in laterally spaced parallel relationship. A pair of reels 20 and 21 are mounted on spindles 17 and 18, respectively, and in driving engagement therewith; and each of the reels 20 and 21 is adapted to serve alternately as a supply reel and a take-up reel for the elongated flexible material 10. A capstan 22 is journalled in bearings in mounting plate 15 of mounting structure 12 and extends vertically upwardly therefrom through aperture 23 formed in top plate 13 to be disposed intermediate spindles 17 and 18 in parallel relationship therewith. A constant speed, unidirectional, rotary driving motor 24 is secured to mounting plate 15 and has a driving head comprising a pair of axially adjoining pulleys 25 and 26 of different diameters secured to the drive shaft 27 thereof.

Separate drive trains extend from the motor 24 to the spindles 17 and 18 and capstan 22. The drive trains to the spindles 17 and 18 are similar and are adapted to drive spindles 17 and 18 in opposite directions responsive to the single given direction of rotation of the motor 24; and each comprises a clutch mechanism 28, which is an important feature of my invention. The individual drives from the motor 24 to each of the clutch mechanisms 28 may be of any suitable construction, the particular form of which is unimportant, and herein comprise adjacent pulleys 29 driven by a common belt 30 which is driven by pulley 26. A pair of pulleys 31 are mounted on shafts 32 journalled in mounting plate 15. Each of the shafts 32 is in common with one of the pulleys 29 and one of the pulleys 31; and each of the pulleys 31 is in driving engagement with one of the clutch mechanisms 28 through belts 33.

Figures 5, 6, 7:
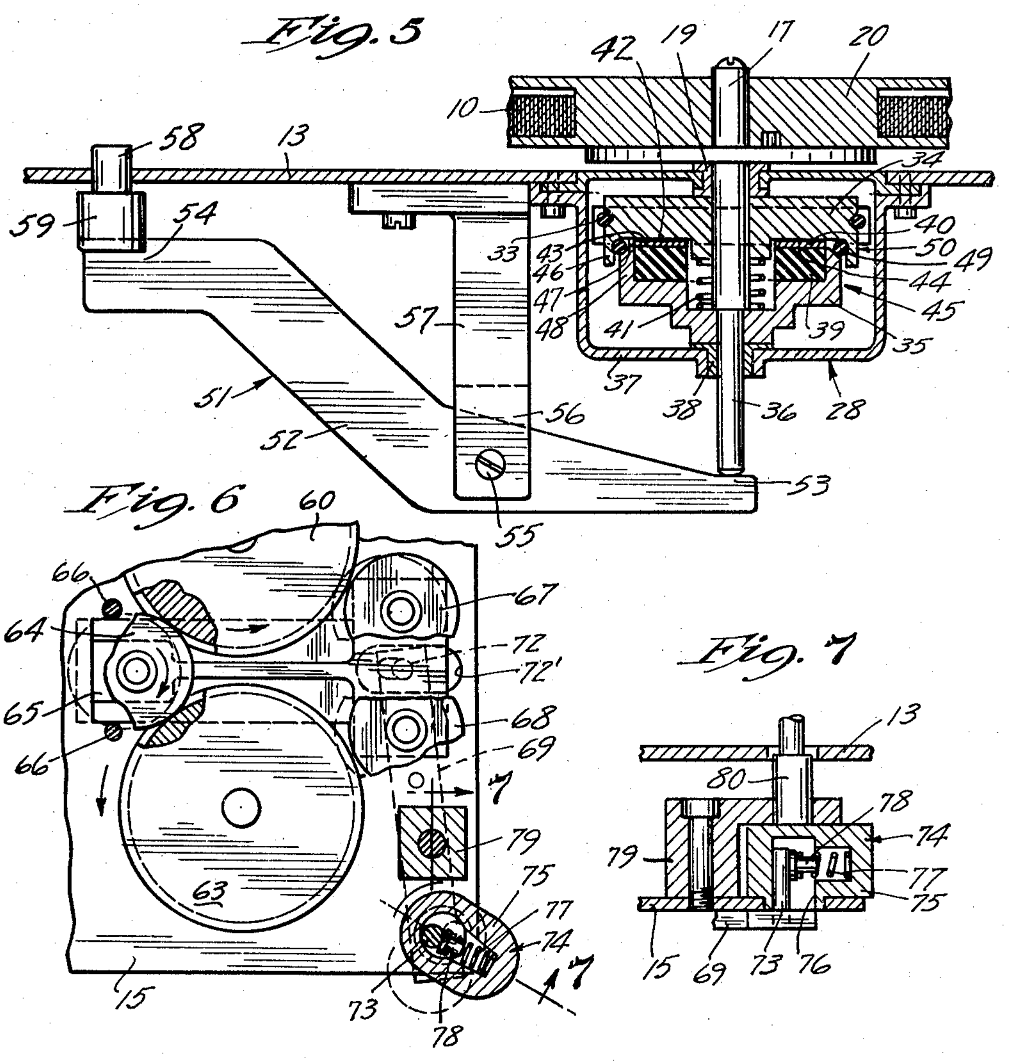
Fig. 5 is an enlarged detailed view in vertical section taken on the line 5—5 of Fig. 3.
Fig. 6 is an enlarged fragmentary view in horizontal section taken on the line 6—6 of Fig. 3.
Fig. 7 is a fragmentary detailed view in vertical section taken on the line 7—7 of Fig. 6.

Referring in particular to Fig. 5, each of the clutch mechanisms 28 comprises a driving clutch element 34 mounted loosely on the spindle 17; it being understood that the detail of clutch mechanism 28 associated with spindle 17 is the same as that associated with spindle 18 so what is recited with respect to the clutch mechanism in the drive train to spindle 17 in this regard is equally true of the clutch mechanism 28 in the drive train to spindle 18. Clutch element 34 is grooved to receive the belt 33. A driven clutch element 35 is mounted fast on the reduced diameter lower end portion 36 of spindle 17 by a pin, key or the like, and is more or less cup-shaped. The clutch elements 34 and 35 are concentrically disposed on the spindle 17 and are enclosed by a depending housing 37 secured to the panel 13. A bearing 38 mounts the lower end 36 of the spindle 17 for rotation with respect to the housing 37 and for limited axial movement of the spindle 17 with respect thereto. Driven clutch element 35 contains and carries therewith a resilient yieldable annular biasing member 39 which, in turn, carries on its upper surface a clutch member 40 which comprises an annular metallic friction plate. A coil compression spring 41 biases the driving clutch element 34 in an upward direction to the limits permitted by bearing 19 and the driven clutch element 35 in a downward direction to the limits permitted by bearing 38. Driving clutch element 34 has an annular clutch face 42 oppositely disposed to the upper surface or clutch face 43 of clutch member 40; and their adjacent clutch faces are separated by a viscous substance 44, which preferably is a thin film of silicone oil. Biasing member 39 urges the opposed clutch faces 42 and 43 toward one another to maintain the viscous substance 44 between the adjacent clutch faces 42 and 43 and under approximately predetermined pressure therebetween to define a continuously operating two-way acting slippage clutch indicated in its entirety by the numeral 45.

Driving clutch element 34 has a portion of clutch face 42, indicated by the numeral 47, which is disposed between an annular flange 46 and that portion of face 42 which is in contact with the viscous substance 44. Portion 47 of clutch face 42 is oppositely disposed to a portion of driven member 35 which is indicated by the numeral 48 and which comprises an annular beveled rim. Driving clutch element 34 and driven clutch element 35 are movable toward and away from each other; and in particular, driven element 35 is movable in an upward direction against the bias of spring 41 to move rim portion 48 of clutch element 35 into engagement with a resilient friction ring 49, which may be a rubber O-ring, carried by driving clutch element 34 adjacent portion 47 thereof. The upward movement of driven clutch element 35 moving rim portion 48 thereof into engagement with ring 49 defines a positive friction driving relationship between driving and driven elements 34 and 35 and the release thereof to its normal position shown in Fig. 5 defines a fully released non-driving relationship between driving and driven clutch elements 34 and 35; thus defining a primary clutch, indicated in its entirety by the numeral 50, which is a shiftable friction clutch having a fully released non-driving position and a positive drive position.

Thus, it is clear that each of the clutch mechanisms 28 comprises a primary clutch 50, having a fully released non-driving position and a drive position, and a secondary clutch 45 interposed in parallel relationship therewith, which is a continuously operating two-way acting slippage clutch.

A manually controlled mechanism for selectively shifting either of the primary clutches 50 from released position to drive position comprises a separate operating mechanism for each clutch mechanism 28, and each is indicated in its entirety by the numeral 51. Each mechanism 51, see Fig. 5 with respect to the operating mechanism associated with the clutch mechanism 28 in the drive train to spindle 17, comprises a lever arm 52 pivotally secured intermediate its ends 53 and 54 at the point indicated by the numeral 55 to the forked end 56 of a depending supporting arm 57 which is secured to the top panel 13. End 53 of lever arm 52 is adapted to engage the lower end of reduced portion 36 of spindle 17 (or 18). An operating push button 58 has a slotted enlarged lower portion 59 which engages end 54 of lever arm 52 and projects upwardly through an aperture formed in top panel 13; whereby, the depression of button 58 with respect to top panel 13 moves end 53 in a generally upwardly direction to move spindle 17 (or 18) vertically upwardly to engage the primary clutch 50 of either of the mechanisms 28 in a positive driving relationship. Spring 41 normally biases driving clutch element 35 and the spindle to which it is fixedly attached, either 17 or 18, in a downward direction to normally maintain the primary clutch 50 of each of the clutch mechanisms 28 in a fully released position. Further, each of the lever arms 52 is balanced to return to their normal position shown in Fig. 5 upon a release of pressure by the operator or push button 58.

The drive train from motor 24 to the capstan 22 may be shifted to rotate the capstan 22 in either direction responsive to the single direction of rotation of the shaft 27 of motor 24. The drive train comprises a double-grooved pulley 60 fixed to a shaft 61 which is journalled in bearings mounted in mounting plate 15. A continuous belt 62 passes through one of the grooves of pulley 60 and about pulley 25, which is secured to motor shaft 27, to drive the pulley 60. A grooved pulley 63 is secured to the capstan 22, as particularly shown in Fig. 8, and is disposed in laterally spaced axially parallel relationship with pulley 60. Each of the pulleys 60 and 63 have similar grooves disposed to be engaged in driving relaship by the same roller 64. Roller 64 is carried at one end of a sliding plate 65 guided by pins 66 for longitudinal movements between the rollers 60 and 63, as is particularly shown in Fig. 6. A pair of rollers 67 and 68 are disposed side-by-side in driving engagement and are carried at the opposite end of sliding plate 65 from roller 64. At one position of sliding plate 65, as shown in full lines in Figs. 4 and 6, roller 64 is in driving engagement with pulleys 60 and 63 to rotate pulley 63 and therewith capstan 22 in the direction indicated by the arrow adjacent pulley 63 in Figs. 4 and 6; and at this position of sliding plate 65, rollers 67 and 68 are disposed out of engagement with pulleys 60 and 63. At the second position of sliding plate 65, which is indicated in dotted lines in Figs. 4 and 6, roller 64 is out of engagement with pulleys 60 and 63 and roller 67 is in engagement with pulley 60 and roller 68 is in engagement with pulley 63 to rotate pulley 63 and therewith capstan 22 in the opposite direction than is indicated by the arrow adjacent pulley 63 in Figs. 4 and 6.

The movement of sliding plate 65 to shift the direction of rotation of capstan 22 is actuated by a lever arm 69, disposed on the opposite side of mounting plate 15 from sliding plate 65 and pivotally secured to mounting plate 15 intermediate its ends 70 and 71. End 70 of arm 69 is secured to sliding plate 65 by fastening means 72 which extends through and is movable in a slot 72' formed in the mounting plate 15. A generally vertically upwardly extending pin 73 is secured to end 71 of arm 69. The pivotal movement of lever arm 69 is actuated by a snap-acting switch, indicated by the numeral 74, which comprises a cylindro-oval member 75 having an eccentric downwardly opening bore 76 adapted to receive the pin 73, and a coil compression spring 77 which biases a cam-acting switch element 78 in engagement with the pin 73. A bracket 79 mounts the member 75 for rotation actuated by a shaft 80 secured to the member 75 in eccentric relationship therewith and extending generally vertically upwardly therefrom through the panel 13. A knob 81, see Fig. 1, is secured to the reduced upper end of shaft 80 to effect the rotation thereof. Upon the rotation of member 75 the spring biased cam-acting switch element 78 acts to change the disposition of pin 73 in eccentric bore 76 with a snap action between the two positions shown in full and dotted lines in Fig. 6 to move sliding plate 65 between its two positions shown in full and dotted lines in Fig. 6.

Figure 8:
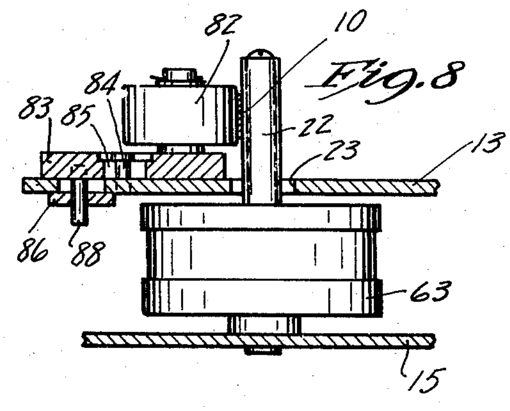
Fig. 8 is an enlarged detailed view in vertical section taken on the line 8—8 of Fig. 1.

Referring in particular to Fig. 8, elongated flexible material 10 passes between capstan 22 and a presser roller 82, and capstan 22 is ineffective in driving the flexible material 10 unless the latter is pressed into engagement with capstan 22 by presser roller 82. Presser roller 82 is secured to a mounting plate 83 and is movable therewith toward and away from capstan 22. Plate 83 is mounted and guided for movement toward and away from capstan 22 by a pin 84 secured to top panel 13 and disposed within a longitudinally extending slot 85 formed in the plate 83. The movement of plate 83 is actuated by lever arm 86 pivotally secured at its end 87 to the under side of panel 13 and engaging intermediate its ends a pin 88 secured to the plate 83. Lever arm 86 is biased by spring 89 to maintain presser roller 82 at the limit of its movement away from capstan 22 wherein flexible material 10 is out of driving engagement with capstan 22. Referring in particular to Fig. 1, knob 90' actuates switch member 90 to pivot arm 86 in a direction to move plate 83 and therewith the presser roller toward capstan 22 and to maintain the presser roller in the position shown in Fig. 8 wherein the flexible material is held in driving engagement with capstan 22.

As previously mentioned reels 20 and 21 adapted to serve alternately as a supply reel and a take-up reel of the elongated material 10; and referring in particular to Fig. 1, flexible material 10 extending between the two reels 20 and 21 passes over guides 91, one disposed adjacent each reel, a pair of transducer or sensing heads 92 disposed on opposite sides of the capstan 22, and between presser roller 82 and capstan 22. It should again be noted that capstan 22 is ineffective in driving the flexible material 10 unless presesr roller 82 is in position to hold the material 10 in driving engagement with capstan 22. The transducer or sensing heads 92 are each adapted for recording or reproducing the signals on material 10 on separate lanes thereof, however, heads 92 form no part of the present invention and comprise elements well known in the art.

Assuming motor 24 to be operative, both of the primary clutches 50 of the clutch mechanisms 28 to be in fully released non-driving position, and capstan 22 to be out of driving engagement with the flexible material 10, a drive of substantially equal and opposite force is transmitted to each of the spindles 17 and 18 through the continuously operating two-way acting slippage clutches 45 of the individual drive trains to spindles 17 and 18; this drive tends to drive spindles 17 and 18 in opposite directions responsive to the single given direction of rotation of the motor 24, and thereby maintain the flexible material 10 substantially in a taut condition of equilibrium. Therefore, when presser roller 82 is moved toward capstan 22 to hold material 10 in driving engagement therewith, the drive of capstan 22 will determine the speed and direction of travel of the material 10. The drive of capstan 22 by the unidirectional motor 24 is easily maintained at a constant velocity, and the drive trains to the spindles 17 and 18 through the secondary clutches 45 maintain material 10 in a taut condition during the driving thereof by capstan 22 to insure a proper tensioning of the material 10 at all times.

In addition to the drive of material 10 by capstan 22, as afore-mentioned, I have provided the primary clutches 50 of each of the clutch mechanisms 28 to produce a positive non-slippage drive of either spindle 17 or 18 when either of the primary clutches 50 are set in drive position. This drive through primary clutches 50 may be particularly adapted for a reeling or re-reeling of the material 10 at a speed or rate faster than is effected by capstan 22. Therefore, assuming pressure roller 82 to be at the limit of its movement away from capstan 22 wherein material 10 is out of driving engagement with capstan 22, the operation of either of the operating mechanisms 51 by depressing either of the push buttons 58 effects a positive non-slippage drive of material 10 in either direction; that is, either wound on reel 20 and unwound from reel 21 or wound on reel 21 and unwound from reel 20. If primary clutch 50 in the drive train from motor 24 to spindle 17 is set in drive position by depressing push button 58, shown in Fig. 5, and the primary clutch 50 in the drive train from motor 24 to spindle 18 is in its fully released non-driving position, the primary clutch 50 and the secondary clutch 45 in the drive train to spindle 17, which clutches are disposed in parallel relationship as afore-mentioned, co-operate to produce a positive non-slippage drive of spindle 17 and material 10, which overcomes the opposing driving force transmitted by the secondary clutch 45 in the drive train to spindle 18; and material 10 will be effectively wound on reel 20 and unwound from reel 21. The opposing driving force transmitted by secondary clutch 45 in the drive train to spindle 18, which opposes the direction of rotation of spindle 17 and tends to drive material 10 in the opposite direction, maintains material 10 in a taut condition, and provides a proper tension thereof during its passing between the two reels 20 and 21. It is important to reiterate with respect to the drive of spindle 17 (or 18) that the viscous dampening or drag effected by the secondary clutch 45 in parallel with the operative primary clutch 50 co-operate with the manually controlled friction clutch elements of the operative clutch 50 to provide the positive non-slippage drive of material 10 and that the other secondary clutch 45 in parallel with the inoperative primary clutch 50 acts to properly tension the material 10 and produce a dampening or dragging action. It is also important to note that each of the secondary clutches 45 is substantially independent of the position of the primary clutches 50 with which each secondary clutch 45 is associated; that is, the biasing member 39 of each of the secondary clutches 45 maintains the viscous substance 44 under approximately predetermined pressure between the clutch faces 42 and 43, which is independent of the position of each primary clutch 50, whether in drive position or in fully released non-driving position.

It is clear that the operation of my invention, whereby the primary clutch 50 in the drive train from motor 24 to spindle 18 is moved into drive position by the operating mechanism 51 associated therewith and which is adapted to positively drive spindle 18 and material 10 against viscous dampening or drag effected by the secondary clutch 45 in the drive train from motor 24 to spindle 17, is the same as that described above with respect to the positive drive of spindle 17; and material 10 will thereby be wound on reel 21 and unwound from reel 20.

My invention has been built and tested and found to accomplish all of the afore-mentioned objectives and advantages. It will be obvious to those skilled in the art that my invention may be modified by many substitutions and equivalents; and therefore, I intend to be limited solely by the scope of the appended claims.

What I claim is:

1. In a machine for reeling and unreeling elongated flexible material such as wire or tape, two reel mounting spindles, a pair of reels each mounted on and in driving engagement with a different one of said spindles and each adapted to serve alternately as a supply reel and a take-up reel, a mounting structure, means journalling the spindles in the mounting structure in laterally spaced relationship, a common rotary driving motor for said spindles, separate drive trains from said motor each to a different one of said spindles, said drive trains driving the spindles in opposite directions responsive to a single given direction of rotation of the motor, each said drive train comprising a primary clutch and a secondary clutch interposed therein in parallel drive relationship, the primary clutch of each drive train being a shiftable friction clutch having a fully released non-driving position and a drive position, the secondary clutch of each drive train being a continuously operating two-way acting slippage clutch, manually controlled mechanism for selectively shifting either of the primary clutches from released position to drive position, the primary and secondary clutches of each drive train co-operating to produce positive non-slippage drive when the primary clutch is set in drive position, the secondary clutch of each drive train tending to drive the spindle of its drive train in a direction opposing the direction of rotation of the spindle of the other drive train when the primary clutch of the other drive train is in drive position; whereby, when the primary clutch of one drive train is in drive position and the primary clutch of the other drive train is in released position, the primary and secondary clutches of said one drive train co-operate to transmit sufficient driving energy to overcome the opposing driving force transmitted by the secondary clutch of the other drive train to produce positive non-slippage drive and the opposing driving force transmitted by the secondary clutch of the other drive train maintains the material passing between the two reels in a taut condition and prevents backlash from said drive train.

2. The structure defined in claim 1 in which the secondary clutch of each drive train is a viscous clutch.

3. The structure defined in claim 1 in which the secondary clutch of each drive train comprises co-operating driving and driven members having opposed clutch faces mounted for relative movements one toward and from the other, a viscous substance between the opposed clutch faces, and yielding means urging the co-operating opposed clutch faces toward one another to maintain the viscous substance under approximately predetermined pressure between said faces.

4. The structure defined in claim 1 in which the primary clutch and secondary clutch of each drive train comprise common concentrically disposed driven and driving elements.

References Cited in the file of this patent

UNITED STATES PATENTS

| | | |
|---|---|---|
| 2,304,913 | Herzig | Dec. 15, 1942 |
| 2,545,960 | Kuehn | Mar. 20, 1951 |
| 2,686,637 | Dashiell et al. | Aug. 17, 1954 |
| 2,706,637 | Cain | Apr. 19, 1955 |
| 2,731,119 | Burdett et al. | Jan. 17, 1956 |